US012043148B2

(12) United States Patent
Park et al.

(10) Patent No.: US 12,043,148 B2
(45) Date of Patent: Jul. 23, 2024

(54) SEAT HEIGHT GEAR SYSTEM AND SEAT HAVING THE SAME

(71) Applicants: Hyundai Motor Company, Seoul (KR); Kia Corporation, Seoul (KR); DAS Co., Ltd, Gyeongju-si (KR)

(72) Inventors: Hyung-Jin Park, Gwangmyeong-si (KR); Gil-Ju Kim, Hwaseong-si (KR); Soo-Hyun Moon, Hwaseong-si (KR); Ju-Yeol Kong, Ansan-si (KR); Sung-Hak Hong, Suwon-si (KR); Sang-Do Park, Suwon-si (KR); Ga-Be Nam, Hwaseong-si (KR); Seong-Hwan Song, Suwon-si (KR); Yong-Tak Han, Suwon-si (KR); Duck-Yeol Kim, Osan-si (KR)

(73) Assignees: HYUNDAI MOTOR COMPANY, Seoul (KR); KIA CORPORATION, Seoul (KR); DAS CO., LTD, Gyeongju-si (KR)

( * ) Notice: Subject to any disclaimer, the term of this patent is extended or adjusted under 35 U.S.C. 154(b) by 0 days.

(21) Appl. No.: 17/948,568

(22) Filed: Sep. 20, 2022

(65) Prior Publication Data
US 2023/0278470 A1 Sep. 7, 2023

(30) Foreign Application Priority Data
Mar. 7, 2022 (KR) .................. 10-2022-0028608

(51) Int. Cl.
*B60N 2/16* (2006.01)
*B60N 2/02* (2006.01)
(Continued)

(52) U.S. Cl.
CPC ......... *B60N 2/164* (2013.01); *B60N 2/02246* (2023.08); *B60N 2/502* (2013.01);
(Continued)

(58) Field of Classification Search
CPC .... B60N 2/525; B60N 2/02246; B60N 2/164; B60N 2/165; B60N 2/1665; B60N 2/067;
(Continued)

(56) References Cited

U.S. PATENT DOCUMENTS 1,957,785 A * 5/1934 Knapp ................... B60N 2/067
248/394
4,568,053 A * 2/1986 Strowik ................. B60N 2/164
297/328

(Continued)

FOREIGN PATENT DOCUMENTS

JP          2019182178 A       10/2019

*Primary Examiner* — Syed A Islam
(74) *Attorney, Agent, or Firm* — Slater Matsil, LLP (57) ABSTRACT

An embodiment is a seat height gear system including a monopost apparatus configured to be mounted under a seat, the monopost apparatus comprising a lower post and an upper post, and a direct drive motor apparatus within the monopost apparatus, the direct drive motor apparatus including a motor and a gear unit, the gear unit including a pinion and a rack bar, the rack bar being configured to be engaged with the pinion, the motor being fixed to the lower post of the monopost apparatus, the pinion being coupled to the motor, the rack bar being fixed to an upper post of the monopost apparatus, the motor being configured to rotate the pinion, and the rack bar being configured to convert the rotation of the pinion into the linear motion.

20 Claims, 6 Drawing Sheets

<EXPLODED PERSPECTIVE VIEW>

(51) Int. Cl.
*B60N 2/50* (2006.01)
*B60N 2/52* (2006.01)
*B60N 2/68* (2006.01)

(52) U.S. Cl.
CPC .............. *B60N 2/525* (2013.01); *B60N 2/68* (2013.01); *B60N 2/02253* (2023.08); *B60N 2/02258* (2023.08)

(58) Field of Classification Search
CPC .. B60N 2/1625; B60N 2/1635; A47C 23/067; A47C 19/04; A47C 19/045; A47C 1/029; A47C 3/26; A47C 3/265; A61G 7/0516; A61G 5/1059; A61G 5/14
See application file for complete search history.

(56) References Cited

U.S. PATENT DOCUMENTS

| | | | | |
|---|---|---|---|---|
| 5,450,800 | A * | 9/1995 | Leonard ............. | A47B 21/0073 74/89.17 |
| 6,899,394 | B2 * | 5/2005 | Wang ..................... | A47D 1/004 297/344.22 |
| 10,034,538 | B1 * | 7/2018 | Masters .................. | B25H 1/16 |
| 2021/0316641 | A1 * | 10/2021 | Cho ..................... | B60N 2/1635 |

* cited by examiner

<EXPLODED PERSPECTIVE VIEW>

SEAT HEIGHT GEAR SYSTEM AND SEAT HAVING THE SAME

CROSS-REFERENCE TO RELATED APPLICATIONS

This application claims the benefit of Korean Patent Application No. 10-2022-0028608, filed on Mar. 7, 2022, which application is hereby incorporated herein by reference.

TECHNICAL FIELD

The present disclosure relates to a seat height apparatus.

BACKGROUND

In general, a monopost seat (i.e., one rail seat) among seats for a vehicle adjusts the height of the seat by using a height mechanism.

As an example, there is a height lead screw mechanism apparatus. For example, the height lead screw mechanism apparatus includes a lower post and an upper post, which are fixed units on a floor panel of a vehicle body to which a motor head of a motor that is a power source is assembled on an upper end thereof, and is composed of a motor lead screw installed below the motor between the lower and upper posts.

Therefore, the height lead screw mechanism apparatus implements a seat height function capable of adjusting the height of the seat by moving a nut guide of the motor lead screw upward/downward or forward/backward.

However, a height operation section of the height lead screw mechanism apparatus is inevitably determined depending on the length of the motor lead screw.

Particularly, an operating length of the motor lead screw is substantially considerably limited, and this is because the entire motor apparatus is configured in an internal space of a package of the lower post and the dimension of the nut guide part assembled thereto should also be considered in order to set the operating length of the motor lead screw.

Therefore, the operating length of the motor lead screw is considerably limited, so that the operating length thereof should be limited to about 50 mm in the design for the substantial height section.

In addition, the height lead screw mechanism apparatus has a structural problem in that a speed difference of about 5 seconds occurs between height moving up and down speeds while a height noise is caused by lack of thrust of the motor when the motor lead screw is operated, and the increase in the torque of the motor for solving the lack of the thrust requires an increase in the size of the motor, so that the height lead screw mechanism apparatus may not be applied to the concept package having the motor lead screw structure.

Furthermore, the height lead screw mechanism apparatus is unilaterally operated by an internal tolerance of the nut guide, has the rotation direction of a screw and a height movement direction, which do not match with each other, and also causes a phenomenon in which the height operation is delayed.

The contents described in Description of Related Art are to help the understanding of the background of the present disclosure, and may include what is not previously known to those skilled in the art to which the present disclosure pertains.

SUMMARY

Therefore, an object of the present disclosure considering the above point is to provide a seat height gear system and a seat having the same, which may perform a height operation in a direct drive motor method, thereby reinforcing a durable rigidity of a height mechanism and adjusting the height of a seat by minimizing a height clearance, and particularly, minimize the components by using a dual rack/pinion as a gear mechanism, thereby implementing a height mechanism package suitable even for a small cushion frame type monopost for increasing a sense of space.

A seat height gear system according to the present disclosure for achieving the object includes a direct drive motor apparatus for converting a rotation motion of a motor into a linear motion by gear-coupling a pinion and a rack bar, and a monopost apparatus mounted under a seat and forming a height operation section by the linear motion to adjust the height of the seat.

As a preferred exemplary embodiment, the pinion is coupled to the motor fixed to a lower post of the monopost apparatus, and the rack bar is fixed to an upper post of the monopost apparatus.

As the preferred exemplary embodiment, the pinion is rotated by the motor, and the rack bar converts the rotation of the pinion into the linear motion.

As the preferred exemplary embodiment, the rack bar forms a rack to be engaged with the pinion, the rack bar forms an upward inclined angle with respect to the pinion, and the upper post forms a height movement path of the height operation section at the upward inclined angle.

As the preferred exemplary embodiment, the pinion and the rack bar are configured in a dual structure, and the dual structure is formed by arranging the pinions and the rack bars on both left/right portions of a motor shaft protruding from the motor.

As the preferred exemplary embodiment, the upper post is coupled to a lower portion of the seat in a state of being coupled to the lower post, the upper post is coupled to a gas spring fixed to the lower post, and the gas spring is interlocked with the movement of the upper post in the height operation section to perform a buffering operation.

As the preferred exemplary embodiment, the upper post is coupled to a height rail, and the height rail moves with the upper post.

In addition, a seat according to the present disclosure for achieving the object includes: a seat height gear system in which a rack bar engaged with a pinion, which is rotated by a motor fixed to a lower post of a monopost apparatus, with a rack is fixed to an upper post coupled to the lower post, and the upper post forms a height operation section for adjusting the height of a seat together with a height rail by a linear motion of the rack bar due to the rotation of the pinion; and a gas spring interlocked with the upper post in the height operation section to evenly compensate for upper/lower operating forces and to perform a buffering operation.

As a preferred exemplary embodiment, the motor is fixed by being bolt-fastened.

As the preferred exemplary embodiment, the lower post is fixed to a floor panel of s vehicle body, the upper post is fixed to a lower portion of the seat in a state of surrounding the lower post, and the lower post and the upper post are coupled by being bolt-fastened.

As the preferred exemplary embodiment, the gas spring is provided with a cylinder rod interlocked with the upper post, and the cylinder rod is fixed to a fixing boss of the upper post.

The seat height gear system applied to the seat according to the present disclosure implements the following operations and effects.

First, the direct drive motor method implements the height operation of the monopost, thereby reinforcing the durable rigidity of the post mechanism and minimizing the seat clearance compared to the motor lead screw method. Second, the configuration of the direct drive motor is optimized as the dual rack/pinion mechanism structure, so that the motor may be freely configured as the package within the post mechanism (i.e., lower post). Third, since the rack/pinion mechanism structure does not require the spaces for the motor head and the nut guide of the lead screw mechanism structure, it is possible to increase the height movement section by about 160% with the disclosed rack gear compared to the conventional one, and particularly, to apply various height sections by changing only the rack gear in the same concept.

In addition, the additional operations and effects of the seat height gear system are as follows.

Fourth, embodiments of the present disclosure increase the thrust of the motor with the direct drive type motor, and particularly, manage the efficiency of the motor according to the change in load by operating the required torque of the motor to about 30% or less (e.g., 30 Nm->9 Nm) compared to the motor limit torque. Fifth, it is possible to improve the clearance and the operating force by matching the rotation direction of the pinion gear with the movement direction of the rack gear with the rack/pinion mechanism structure, and particularly, to also reduce the difference between the moving up and down speeds of the monopost, which is reduced by about 40% compared to the lead screw method, by about 20% by applying the gas spring. Sixth, it is possible to satisfy the height operation with the dual rack/pinion mechanism structure of the direct drive motor method even if the structure of the monopost seat is changed into the small cushion frame in order to increase the sense of space.

DETAILED DESCRIPTION OF ILLUSTRATIVE EMBODIMENTS

Hereinafter, an exemplary embodiment of the present disclosure will be described in detail with reference to the accompanying exemplary drawings, and this exemplary embodiment is an example and may be implemented by those skilled in the art to which the present disclosure pertains in various different forms, and therefore, is not limited to the exemplary embodiment described herein.

Embodiments of the present disclosure include a seat height apparatus, and particularly, a seat with a seat height gear system capable of reinforcing durable rigidity by a height operation in a direct drive motor method and minimizing a height clearance is applied.

Figure 1:
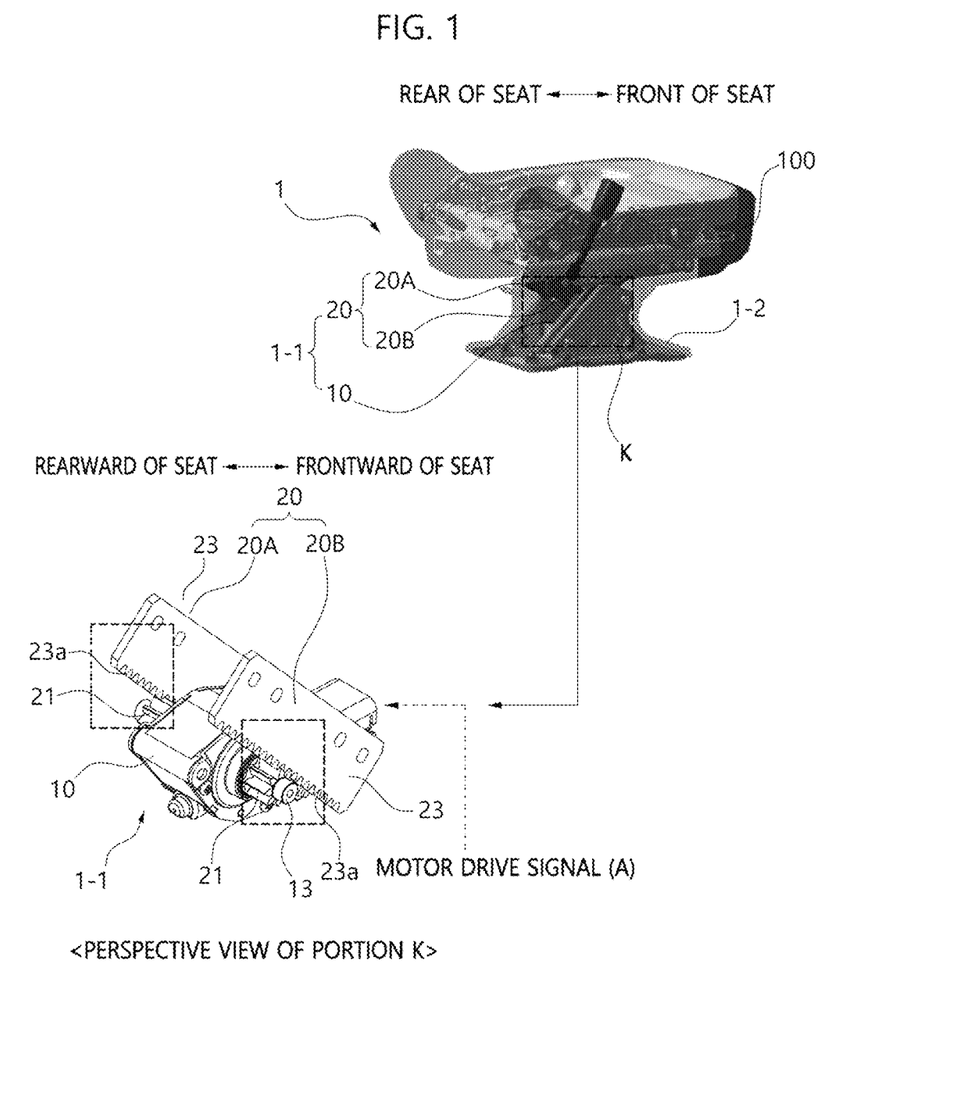
FIG. 1 is a configuration view of a seat height gear system applied to a seat according to the present disclosure.

Referring to FIG. 1, a seat height gear system 1 includes a direct drive motor apparatus 1-1 embedded in an internal space of a monopost apparatus 1-2 mounted under a seat cushion of a backrest and the seat cushion of a seat 100. In this case, the monopost apparatus 1-2 is formed of a single pillar-shaped structure and installed on a seat rail (not shown) on a floor panel of a vehicle body to slide and move the seat 100 forward/backward.

Specifically, the direct drive motor apparatus 1-1 is composed of a motor 10 and a gear unit 20.

For example, the motor 10 generates a rotation power with a motor drive signal (A), and a motor shaft 13 penetrating the inside of the motor 10 protrudes horizontally to both left and right sides of the body of the motor.

In this case, the motor drive signal (A) is generated by an operation button (not shown) provided on a predetermined portion of the seat 100 and connected to the motor 10 by a signal line.

For example, the gear unit 20 is composed of a pair of first and second gears 20A, 20B operated by a rotating force of the motor shaft 13 protruding to the left/right of the motor 10, in which the first gear 20A of the first and second gears 20A, 20B is positioned on the left portion of the motor 10 and the second gear 20B thereof is positioned on the right portion of the motor 10.

In particular, each of the first gear 20A and the second gear 20B is composed of a pinion 21 and a rack 23a, in which the pinions 21 are fixed to the left/right protruding portions of the motor shaft 13 to be rotated with the motor shaft 13, and the rack 23a is formed of a rack gear on one side portion of a rack bar 23 to form a structure integrated with the rack bar 23. In this case, the pinion 21 means a pinion gear, and the rack 23a means a rack gear.

Therefore, the rotation of the pinion 21 linearly moves the rack bar 23 forward/backward through the rack 23a engaged with the pinion 21, and the forward/backward linear movement of the rack bar 23 is switched into a height operation section to adjust the height of the seat 100, so that the height operation section of the seat height gear system 1 is set as the length of the rack gear of the rack bar 23 formed with the rack 23a.

For example, the dimension of the height operation section is secured in a longitudinal direction of the rack gear of the rack bar 23, and securing the dimension is advantageous because the spaces of a motor head and a nut guide required in the conventional lead screw structure are not required.

As a result, the height operation section may make improve marketability by increasing the height movement section by about 160% from the conventional 50 mm to about 80 mm with the longitudinal dimension of the rack bar 23.

In particular, structures of the pinion 21/rack 23a gears applied to the first and second gears 20A, 20B do not require the spaces of the motor head and the nut guide required in the lead screw mechanism structure, so that the motor 10 may be freely configured as a package within a lower post 30 (see FIG. 2) of the monopost apparatus 1-2, and may apply various height sections by adding only the rack gear (i.e., rack bar 23) in the same concept.

Figure 2:
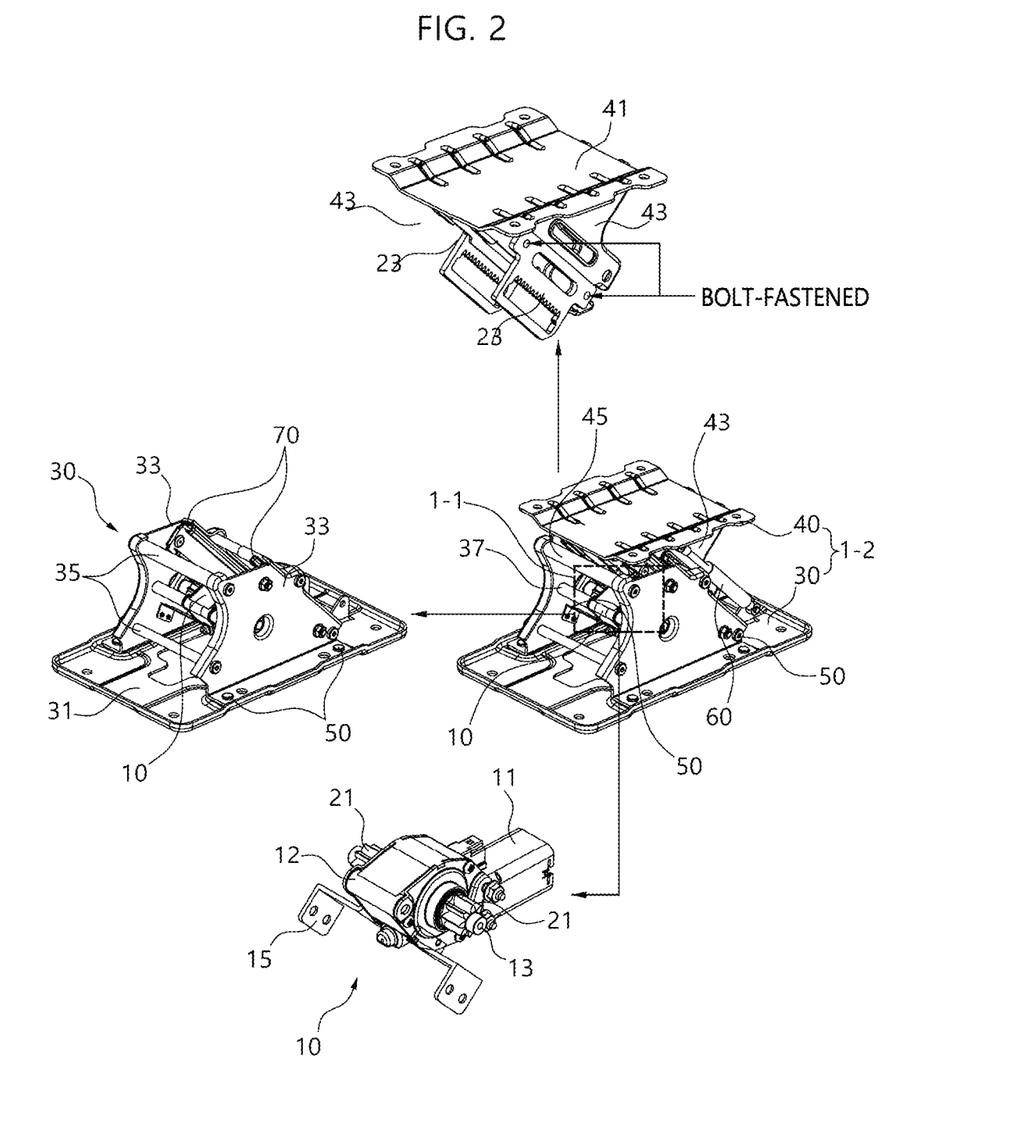
FIGS. 2 and 3 are configuration views of the assembling and disassembling of the seat height gear system composed of a monopost apparatus in which a direct drive motor apparatus according to the present disclosure is embedded.
Figure 3:
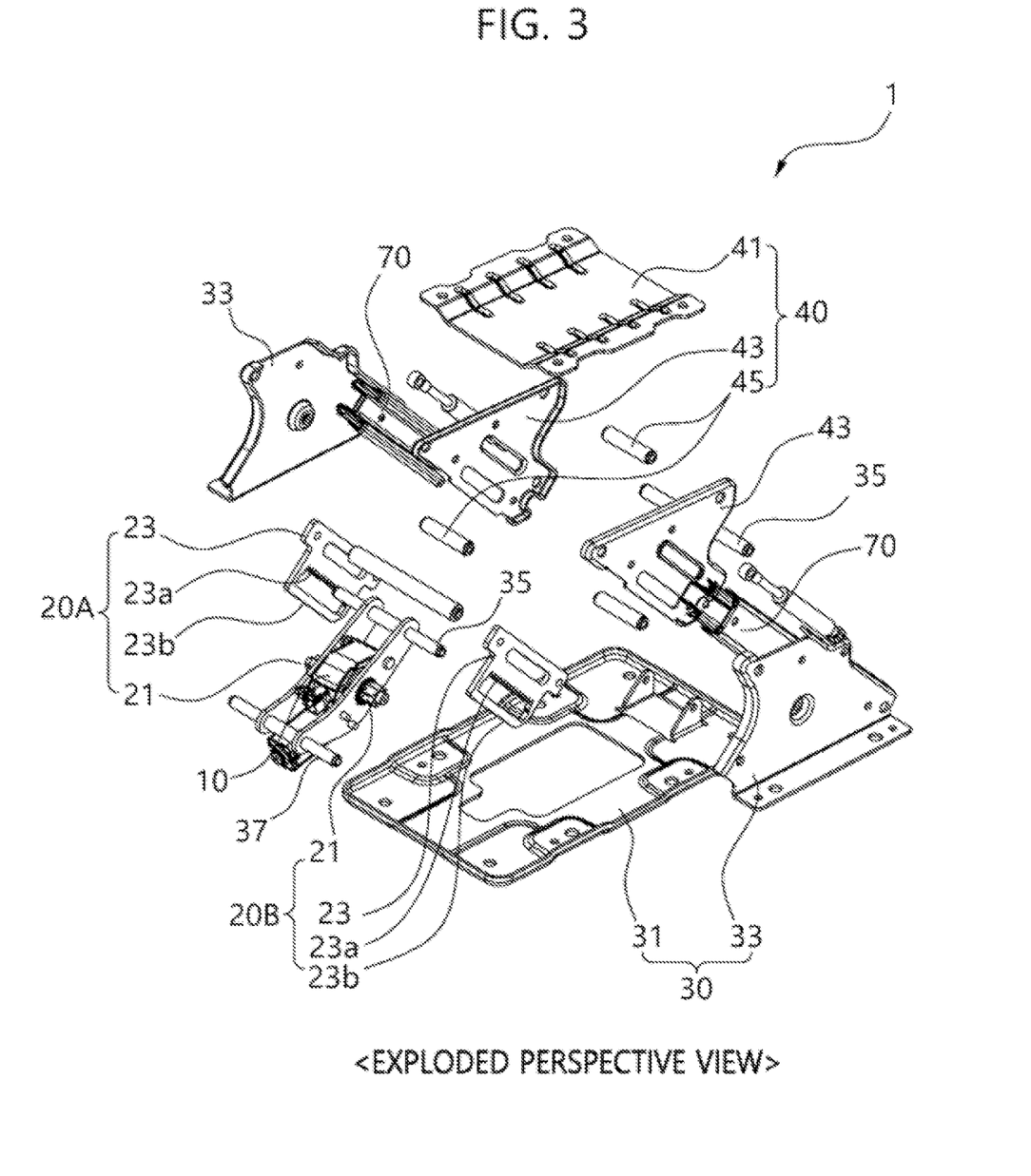
Figure 4:
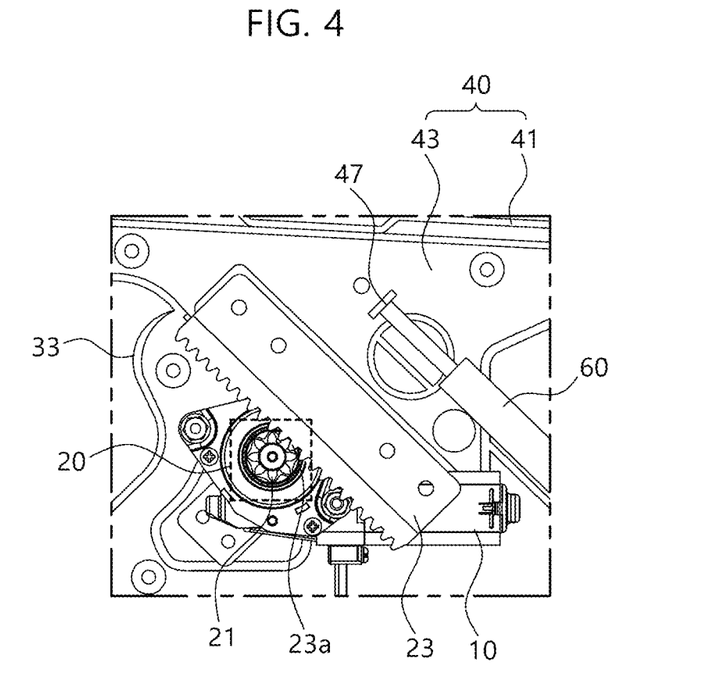
FIG. 4 shows a coupled state of a dual rack/pinion mechanism structure of a seat height gear system according to the present disclosure.

Meanwhile, FIGS. 2 to 4 show configuration views of the assembling and disassembling of the seat height gear system 1.

As shown, the seat height gear system 1 includes the direct drive motor apparatus 1-1 composed of the motor 10 and the gear unit 20, the monopost apparatus 1-2 composed of the lower post 30 and an upper post 40, a screw-fastening bolt 50, a gas spring 60, and a height rail 70. In this case, both the lower post 30 and the upper post 40 are parts of the seat constituting the seat, and perform the relative motion in the height direction in the height operation section.

For example, the motor 10 is composed of a motor housing 11 surrounding a main body of the motor to form a structure in which the motor shaft 13 protrudes to the left/right sides from the main body of the motor having components of the motor embedded therein, a housing holder 12 having a shaft hole perforated by forming the protruding portion on an upper portion of the main body of the motor, and a motor bracket 15 having left/right extension portions formed on a lower portion of the main body of the motor in a bending structure.

In particular, the motor housing 11 is provided with power source/signal connectors (not shown) electrically connected to the motor 10 in an internal space thereof. In addition, the housing holder 12 is assembled with a holder rod 37 penetrating the shaft hole, and the motor bracket 15 is assembled with a pair of left/right lower brackets 33 by being screw-fastened by bolts 50.

Therefore, the motor 10 is positioned in the internal space that is inside the left/right lower brackets 33 of the lower post 30.

For example, the gear unit 20 is composed of the pair of first and second gears 20A, 20B, the pinions 21 of the pinions 21 and the racks 23 constituting the first and second gears 20A, 20B are coupled to the left/right sides of the motor shaft 13 and positioned on the lower post 30 side in the structure integrated with the motor 10, whereas the rack bars 23 are coupled to left/right sliding brackets 43 of the upper post 40 of the monopost apparatus 1-2 and positioned on the upper post 40 side.

Therefore, the first and second gears 20A, 20B are composed of the dual pinion 21 and the dual rack 23a (or the dual rack bar 23), and the rack bar 23 moves upward or downward in the rotation direction of the pinion 21 by the motor 10 in a state where the dual pinion 21 and the dual rack 23a are engaged with each other, so that the upper post 40 performs the height movement that moves upward/downward.

In particular, the rack bar 23 is further formed with a rack flange 23b by which a rack tooth of the rack 23a is surrounded, and the rack flange 23b has a rectangular spatial portion structure as shown in FIG. 3. In this case, the rectangular spatial portion structure may be formed in the same structure on the body of the rack bar above the rack flange 23b, and used as a space in which any one of a holder rod 37 and/or a support rod 35 fixed to the motor support brackets added to both left and right sides of the motor 10 is penetrated.

Specifically, the monopost apparatus 1-2 is composed of the lower post 30 in which the direct drive motor apparatus 1-1 is positioned in the internal space thereof, and the upper post 40 in which the height movement for adjusting the height of the seat 100 is performed by the height operation by the first and second gears 20A, 20B of the gear unit 20.

For example, the lower post 30 is composed of a lower panel 31 bolt-fastened to the floor panel of the vehicle body, the left/right lower brackets 33 vertically stood upward on the left/right sides at an interval in the internal space of the lower panel 31 to form the internal space in which the motor 10 and the first and second gears 20A, 20B are accommodated as the internal space of the bracket, a plurality of support rods 35 across the lower portion of the internal space of the bracket to be fixed to the left/right lower brackets 33, and the holder rod 37 across an upper portion of the internal space of the bracket to penetrate the shaft hole perforated in the housing holder 12 of the motor 10.

In particular, the lower brackets 33 may be formed in an equilateral triangle shape and coupled to the left/right upper brackets 43 with the inverted triangular shape of the upper post 40, and may form places where the bolts 50 are fastened to the left/right upper brackets 43, so that the motor 10 may be fastened to the bolt 50 through the motor bracket 15 and assembled to the lower post 30.

For example, the upper post 40 is composed of an upper panel 41 bolt-fastened to the lower portion of the seat 100, left/right upper brackets 43 vertically stood downward on the left/right at an interval in a space inside the upper panel 41, and a plurality of support rods 45 across an upper portion of the internal space of the bracket to be fixed to the left/right upper brackets 43. In this case, the upper bracket 43 surrounds the left/right lower brackets 33 of the lower post 30, so that the lower post 30 is assembled in a state of positioning the upper post therein and surrounding the same.

In particular, the upper bracket 43 is formed in the inverted triangular shape and coupled to be surrounded by the lower bracket 33 with the equilateral triangular shape of the lower post 30, and the rack bar 23 allows the height movement path of the upper post 40 to form an upward inclined angle as a hypotenuse angle of the inverted triangular shape with respect to the pinion 21 engaged with the rack 23a. In this case, the upward inclined angle is set as about 45°.

In addition, the upper bracket 43 forms the places where the bolts 50 are fastened to both the left/right portions thereof, so that the rack bars 23 of the first and second gears 20A, 20B may be fastened to the bolts 50 through the upper bracket 43 and assembled to the upper post 40.

For example, the bolt 50 fixes the motor bracket 15 of the motor 10 to the support bracket 33 of the lower post 30 (see FIG. 2) and fixes the rack bars 23 of the first and second gears 20A, 20B to the upper bracket 43 of the upper post 40. In addition, the bolt 50 fixes the lower panel 31 of the lower post 30 to the floor panel of the vehicle body (not shown) and fixes the upper panel 41 of the upper post 40 to a seat cushion lower frame (see FIG. 1) of the seat 100.

For example, the gas spring 60 allows a cylinder rod to be drawn in and drawn out by the height movement of the upper post 40 that moves upward/downward with the rack bar 23 engaged with the pinion 21 by the rack 23a and therefore, is interlocked with the upper post in the height operation section by tensile and compressive operations, thereby evenly compensating for the upper/lower operating forces and alleviating shock by a shock buffering operation. In this case, the gas spring 60 is configured as a dual gas spring arranged on the left/right sides of the lower/upper posts 30, 40.

In particular, the gas spring 60 has the end of the cylinder rod fixed to a fixing boss 47 (see FIG. 4), and the fixing boss 47 protrudes from an outer surface of the upper bracket 43 of the upper post 40.

Therefore, the gas spring 60 may have the improvement effect that reduces the speed difference while moving upward/downward by supplementing the load received by the motor 10 and reducing the motor RPM deviation of the motor 10 that occurs in the height operation direction. Therefore, the gas spring 60 contributes to a structure of improving the height moving up/down speeds.

For example, the height rail 70 is composed of a pair of left/right height rails 70, is positioned between the lower bracket 33 of the lower post 30 and the upper bracket 43 of the upper post 40, and moves with the upper bracket 43 of the upper post 40 during the height movement of the rack bar 23 (see FIG. 6), thereby stably supporting the height movement of the upper panel 41.

Figure 6:
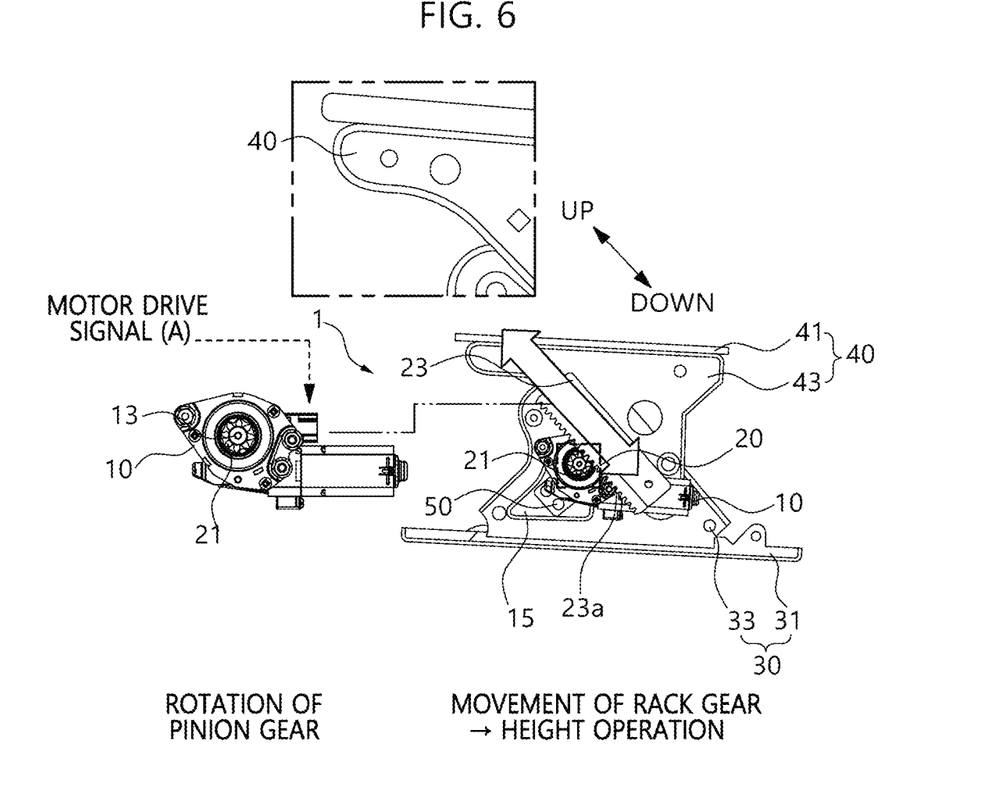
FIG. 6 shows an operation state where the seat height gear system according to the present disclosure moves upward/downward through the operation of the dual rack/pinion mechanism.

In particular, each of the left/right height rails 70 is formed of a "C" shaped bracket and fixed by welding in a state of overlapping each other.

Figure 5:
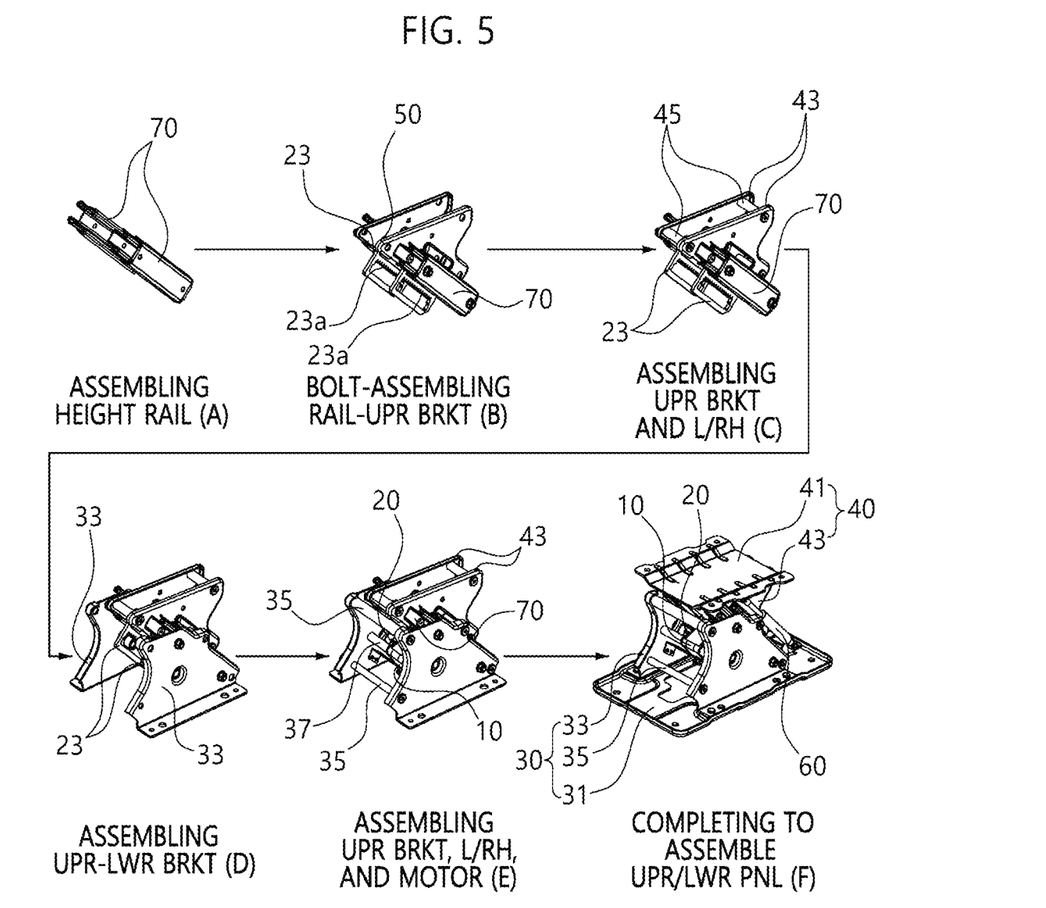
FIG. 5 is an assembling process view of the seat height gear system according to the present disclosure.

Meanwhile, FIG. 5 is an assembling process view of the seat height gear system 1, and this process is performed in the order of assembling the height rail (A)→bolt-assembling the rail-the UPR BRKT (B)→assembling the UPR BRKT and the L/RH (C)→assembling the UPR-LWR BRKT (D)→assembling the UPR BRKT, the L/RH, and the motor (E)→completing to assemble the UPR/LWR PNL (F). In this case, "→" means the proceeding procedure of the assembling process over time.

For example, the assembling the height rail (A) is a process of assembling the left/right height rails 70, the bolt-assembling the rail-the UPR BRKT (B) is a process of fastening the rack bars 23 of the first and second gears 20A, 20B to each of the left/right height rails 70 by rail bolts and then positioning the left height rail 70 inside the left upper bracket of the upper post 40 and the right height rail 70 outside the right upper bracket to fasten them with the bolts 50, and the assembling the UPR BRKT and L/RH (C) is a process of connecting the top portions of the left/right upper brackets 43 with two support rods 45 so that the interval of the left/right upper brackets 43 is maintained.

Subsequently, the assembling the UPR-LWR BRKT (D) is a process of positioning the left/right lower brackets 33 of the lower post 30 outside the left/right upper brackets 43 of the upper post 40 to fasten them with the bolts 50, and the assembling the UPR BRKT, the L/RH, and the motor (E) is a process of positioning the motor 10 between the left/right lower brackets 33 of the lower post 30 to constitute the first and second gears 20A, 20B by engaging the rack 23a of the rack bar 23 with the pinion 21 of the motor 10 (see FIG. 4) and then connecting and fixing the left/right lower brackets 33 with the support rod 35 and the holder rod 37.

Finally, the completing to assemble the UPR/LWR PNL (F) assembles the lower panel 31 of the lower post 30 with the lower portions of the left/right lower brackets 33 with the bolts 50, assembles the upper panel 41 of the upper post 40 with the upper portions of the left/right upper brackets 43 with the bolts 50, and connects two gas springs 60 to the left/right upper brackets 43 in a state of being fixed to the lower panel 31 with the bolts or welding (see FIG. 4).

As described above, the seat height gear system 1 composed of the direct drive motor apparatus 1-1 and the monopost apparatus 102 is manufactured through the assembling process of (A)→(B)→(C)→(D)→(E)→(F). In this case, although the assembling process of the seat height gear system 1 has been described in the order of (A)→(B)→(C)→(D)→(E)→(F), the proceeding order may be changed in terms of assembling convenience.

In addition, FIG. 6 shows the height operation of the monopost apparatus 1-2 through the operation of the direct drive motor apparatus 1-1 in the seat height gear system 1. As shown, in the direct drive motor apparatus 1-1, the left/right pinions 21 of the dual pinion are together rotated with the motor shaft 13 by driving the motor 10 by the motor drive signal (A). In this case, it is assumed that the rotation (i.e., forward rotation) of the motor 10 generates a height upward movement (Up).

Then, the left/right rack bars 23 of the dual rack bar receive the upward force to move upward through the rack 23a engaged with the pinion 21, and the upper post 40 is switched to a state of receiving the upward force through the left/right upper brackets 43 fixed to the rack bars 23 with the bolts 50 and therefore, generates the height upward movement (Up) in a state of being fixed to the lower post 30 coupled to the floor panel of the vehicle body. In this case, the gas spring 60 has the end of the cylinder rod fixed to the fixing boss 47 (see FIG. 3) formed on the left/right upper brackets 43 of the upper post 40 drawn out therefrom.

As a result, the upper post 40 forms the height upward movement (Up) through the rack bar 23 within the maximum range of about 80 mm, so that the height of the seat 100 may move upward by the distance of the height upward movement (Up).

On the contrary, the upper post 40 lowers the height of the seat 100 by the distance of a height downward movement (Down), and this operation implements the rotation direction of the motor 10 as the reverse rotation that is the opposite direction to the forward rotation.

Therefore, since it is apparent that the height downward movement (Down) is implemented through the reverse rotation of the pinion 21/the rack bar 23 and the downward movement of the upper post 40/the compression of the gas spring 60, it may be clearly understood even if a detailed description thereof is omitted.

As described above, the seat height gear system 1 applied to the seat 100 according to the present exemplary embodiment may convert the rotation of the motor 10 fixed to the lower post 30 in the internal space of the lower/upper posts 30, 40 coupled by overlapping each other into the linear movement by the rack bar 23 engaged with the pinion 21 and form the height operation section for adjusting the height of the seat by the upper post 40 fixed to the rack bar 23 to implement the height operation in the direct drive motor method, thereby reinforcing the durable rigidity of the height mechanism and minimizing the height clearance when adjusting the height, and particularly, may minimize components by using the dual rack/pinion as the gear mechanism, thereby also satisfying the height mechanism package suitable even for the small cushion frame type monopost for increasing the sense of space.

What is claimed is:

1. A seat height gear system comprising:
   a direct drive motor apparatus configured to convert a rotation motion of a motor into a linear motion by gear-coupling a pinion and a rack bar; and
   a monopost apparatus mounted under a seat and having a height operation section, the height operation section being configured to adjust the height of the seat with the linear motion,
   wherein the pinion is coupled to the motor fixed to a lower post of the monopost apparatus, and wherein the rack bar is fixed to an upper post of the monopost apparatus,
   wherein a pair of left/right height rails are positioned between a lower bracket of the lower post and an upper bracket of the upper post, each of the left/right height rails include a "⊂" shaped bracket, the pair of left/right height rails being configured to move with the upper bracket of the upper post during a height movement of the rack bar, and
   wherein the rack bar includes a rack flange by which a rack tooth of the rack bar is surrounded, and the rack flange has a rectangular spatial portion structure configured to accommodate a support rod or a holder rod connected with the lower bracket of the lower post.

2. The seat height gear system of claim 1, wherein the motor is configured to rotate the pinion, and wherein the rack bar is configured to convert the rotation of the pinion into the linear motion.

3. The seat height gear system of claim 2, wherein the rack bar is configured to be engaged with the pinion.

4. The seat height gear system of claim 1, wherein the rack bar has an upward inclined angle with respect to the pinion, and wherein the upper post has a height movement path of the height operation section at the upward inclined angle.

5. The seat height gear system of claim 1, wherein the pinion and the rack bar are configured in a dual structure.

6. The seat height gear system of claim 5, wherein the dual structure comprises the pinions and the rack bars on both left and right portions of a motor shaft protruding from the motor.

7. The seat height gear system of claim 1, wherein the upper post is coupled to a lower portion of the seat in a state of being coupled to the lower post.

8. The seat height gear system of claim 7, wherein the upper post is coupled to a gas spring fixed to the lower post, and wherein the gas spring is interlocked with movement of the upper post in the height operation section and configured to perform a buffering operation.

9. The seat height gear system of claim 7, wherein the upper post is coupled to the pair of left/right height rails.

10. A seat comprising:
a seat height gear system comprising a rack bar engaged with a pinion, the pinion configured to be rotated by a motor fixed to a lower post of a monopost apparatus with the rack bar being fixed to an upper post, the upper post being coupled to the lower post, and the upper post being configured to move with a height rail by a linear motion of the rack bar due to the rotation of the pinion in a height operation section, the height operation section being configured to adjust the height of a seat; and
a gas spring interlocked with the upper post to compensate for upper/lower operating forces in the height operation section and configured to perform a buffering operation,
wherein a pair of left/right height rails are positioned between a lower bracket of the lower post and an upper bracket of the upper post, each of the left/right height rails include a " ⊂ " shaped bracket, the pair of left/right height rails being configured to move with the upper bracket of the upper post during a height movement of the rack bar, and
wherein the rack bar includes a rack flange by which a rack tooth of the rack bar is surrounded, and the rack flange has a rectangular spatial portion structure configured to accommodate a support rod or a holder rod connected with the lower bracket of the lower post.

11. The seat of claim 10, wherein the motor is fixed by being bolt-fastened.

12. The seat of claim 10, wherein the lower post is fixed to a floor panel of a vehicle body, and
wherein the upper post is fixed to a lower portion of the seat.

13. The seat of claim 12, wherein the lower post and the upper post are coupled by being bolt-fastened.

14. The seat of claim 10, wherein the gas spring is provided with a cylinder rod interlocked with the upper post, and wherein the cylinder rod is fixed to a fixing boss of the upper post.

15. A seat height gear system comprising:
a monopost apparatus configured to be mounted under a seat, the monopost apparatus comprising a lower post and an upper post; and
a direct drive motor apparatus within the monopost apparatus, the direct drive motor apparatus comprising a motor and a gear unit, the gear unit comprising a pinion and a rack bar, the rack bar being configured to be engaged with the pinion, the motor being fixed to the lower post of the monopost apparatus, the pinion being coupled to the motor, the rack bar being fixed to an upper post of the monopost apparatus, the motor being configured to rotate the pinion, and the rack bar being configured to convert the rotation of the pinion into linear motion,
wherein a pair of left/right height rails are positioned between a lower bracket of the lower post and an upper bracket of the upper post, each of the left/right height rails include a " ⊂ " shaped bracket, the pair of left/right height rails being configured to move with the upper bracket of the upper post during a height movement of the rack bar, and
wherein the rack bar includes a rack flange by which a rack tooth of the rack bar is surrounded, and the rack flange has a rectangular spatial portion structure configured to accommodate a support rod or a holder rod connected with the lower bracket of the lower post.

16. The seat height gear system of claim 15 further comprising:
pinions and the rack bars on both left and right portions of a motor shaft protruding from the motor.

17. The seat height gear system of claim 15 further comprising:
a gas spring coupled to the upper post and fixed to the lower post, the gas spring being interlocked with movement of the upper post and configured to perform a buffering operation.

18. The seat height gear system of claim 15, wherein the lower post is configured to be fixed to a floor panel of a vehicle body, and wherein the upper post is configured to be fixed to a lower portion of the seat.

19. The seat height gear system of claim 15, wherein the motor is configured to be fixed by being bolt-fastened.

20. The seat height gear system of claim 15, wherein the pinion and the rack bar are configured in a dual structure.

* * * * *